No. 628,116. Patented July 4, 1899.
J. VON DER POPPENBURG.
GALVANIC BATTERY.
(Application filed Nov. 7, 1898.)
(No Model.)
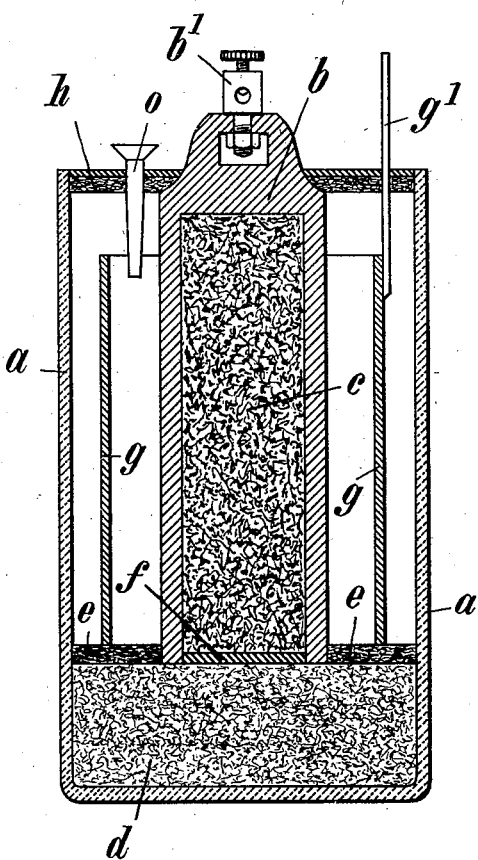
Witnesses
B. F. Thu.
B. K. Sommers
Inventor
Johannes von der Poppenburg.
by _____
Atty.

UNITED STATES PATENT OFFICE.

JOHANNES VON DER POPPENBURG, OF CHARLOTTENBURG, GERMANY.

GALVANIC BATTERY.

SPECIFICATION forming part of Letters Patent No. 628,116, dated July 4, 1899.

Application filed November 7, 1898. Serial No. 695,735. (No model.)

*To all whom it may concern:*

Be it known that I, JOHANNES VON DER POPPENBURG, a subject of the German Emperor, residing at Charlottenburg, near Berlin, in the German Empire, have invented certain new and useful Improvements in Galvanic Batteries, of which the following is a specification.

This invention relates to improvements in primary galvanic batteries, and has for its object improvements in the construction of the same, more especially for the purpose of producing a battery of increased efficiency.

In the accompanying drawing I have shown a vertical section of a practical form of galvanic cell (element) constructed according to my invention.

My improved battery possesses the following characteristic features: A high voltage relatively to the size of the battery, produces a strong current, occupies a proportionately small space, and is capable of being transported and kept for a long time when dry and of being rendered fit for use immediately by the addition of water.

The lower portion of the outer vessel $a$ of the battery is filled with a layer $d$ of a sulfate that does not readily dissolve—as, for instance, calcium sulfate or gypsum, $CaSO_4$, or its equivalent. The layer of gypsum, together with the porous partition, serves to hold the electrodes in their relative position and prevent the same from swaying to and fro in handling, thereby greatly lessening the danger of breakage, the outer vessel being in practice made of glass. Upon this bottom layer $d$ is placed a carbon electrode $b$, having the form of a cup or open-ended hollow cylinder, which electrode is filled with any suitable depolarizing substance $c$, as potassium sulfate or bisulfate and manganese dioxid, the lower end of the electrode being closed by means of a suitable insulating-plug $f$ of asphalt or the like. The latter therefore separates the depolarizing agent contained within the carbon electrode from the bottom layer $d$ of sulfate, the annular base of the carbon electrode being, however, in direct or close contact with said layer, as indicated in the drawings.

In the intermediate space between the carbon electrode $b$ and the wall of the vessel $a$ and upon the bottom layer $d$ is placed a diaphragm $e$ of porous material, (felt or the like.) This ring-shaped porous partition or diaphragm is shown as interposed between the carbon electrode $b$ and the battery vessel $a$, and upon it rests the metallic electrode $g$, of zinc or other suitable metal, which is provided with the usual contact or conducting strip $g'$, and $b'$ is the contact for the carbon electrode.

The space above the felt partition $e$ is filled with a suitable exciting agent—as chlorid of ammonium, sodium chlorate, or the like—when the vessel $a$ is closed fluid-tight by a cover $h$, coated on its under side with a suitable cement, as asphalt paste or the like, and cemented by means of the said cement to the vessel $a$. In the cover $h$ is fixed a small tube $o$, through which water is introduced for putting the battery into operation.

Having thus described my invention, what I claim as new therein, and desire to secure by Letters Patent, is—

A battery comprising a vessel, a cover sealed thereto, a chambered carbon electrode in said vessel, projecting fluid-tight through the cover thereof, a depolarizing agent in the chamber of said electrode, an insulating-plug closing the lower end of said chamber, a metallic electrode surrounding the carbon electrode and provided with a metallic conductor projecting fluid-tight through the cover of the vessel, a salt of an alkali metal filling the space between the two electrodes and the space between the metallic electrode and the walls of the vessel, and means for introducing water into said spaces, in combination with a bed of a sulfate difficult of solution on which the carbon electrode is seated, and a porous partition surrounding the lower end of said electrode, on which partition the metallic electrode is seated, substantially as set forth.

JOHANNES VON DER POPPENBURG.

Witnesses:
MAX LEMCKE,
E. H. L. MUMMENHOFF.